UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

DIMETHYL-DIISOPROPYL-BENZIDIN AZO DYESTUFFS AND PROCESS OF MAKING SAME.

1,314,925.

Specification of Letters Patent. Patented Sept. 2, 1919.

No Drawing. Application filed September 19, 1917. Serial No. 192,212.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Dimethyl-Diisopropyl-Benzidin Azo Dyestuffs and Processes of Making Same, of which the following is a specification.

The present invention relates to azo dyes produced from dimethyl-diisopropyl-benzidin, by coupling with a suitable amino aromatic body, or a derivative of such an aromatic body, and to the process of producing such dyes.

Dimethyl-diisopropyl-benzidin may conveniently be prepared by reducing mononitro-cymene in an alkaline solution, by means of powdered zinc to produce hydrazo-cymene, and then subjecting the latter to the benzidin reaction. Such a process and the product thereof are claimed in my copending application 191,605, filed September 15, 1917.

The process of the present invention is effected in a general way, by the following series of steps. Dimethyl-diisopropyl-benzidin is first tetrazotized and the product then coupled with the amino body in an acid solution, while maintained at a temperature of 10° C. or below. This last mentioned reaction is likely to be rather slow, requiring in some instances one day and in some instances longer or shorter periods of time, depending upon the relative degree of activity of the amino body employed, temperature, purity and other factors.

As a specific example of the process, the following is given: 29 parts of dimethyl-diisopropyl-benzidin are dissolved in about 300 parts of hot water containing 24 parts of hydrochloric acid (gravity 1.2) and the mixture is then cooled to about 10° C. While maintained at this temperature a further quantity of 36 parts of hydrochloric acid (gravity 1.2) is added, and about 14.4 parts of sodium nitrite, previously dissolved in a small amount of water, is added. This produces the tetrazo derivative.

The tetrazo derivative is added to a cold solution of about 54 parts of sodium naphthionate and 100 parts of water, the mixture stirred mechanically for two or more days. After first one-half of stirring, a solution of 35 parts of sodium carbonate is added, a few drops at a time, so that the whole has been introduced at the end of two days. On the next day the mixture is heated to 80° C. and a little salt is added, so that the solution remains only slightly yellow. The precipitated color is filtered, dried and ground. It is a brown powder, soluble in water with brownish red color and dyes cotton direct from an alkaline bath.

Instead of sodium naphthionate referred to in the above example, various other amino bodies can be employed, such as mono amino cymene, anilin, alpha or beta naphthyl-amin, xylidenes, toluidins, dimethyl anilin, meta phenylene diamin or the sulfonic acids of the above mentioned substances, and the derivatives of these sulfonic acids, such as sulfanilic acid, H-acid (1:8-amino-naphthol-3:6 disulfonic acid), K-acid (1:8 amino-naphthol-4:6 disulfonic acid), RR-acid (2:8-amino-naphthol-3:6 disulfonic acid) 1-amino-8-naphthol-3.5-disulfonic acid, 2-napthylamin-6-sulfonic acid, 2-naphthylamin-7-sulfonic and various others.

In general the sulfonic acids produce water-soluble dyestuffs, but in the case of the simple amins the dyestuffs may or may not be water-soluble.

In the present invention instead of using a single amino aromatic body, a mixture of such bodies can be employed, or preferably one amino body can be combined at one end of the dimethyl-diisopropyl-benzidin structure, and subsequently another amino body (or under some circumstances other materials, such as a hydroxy aromatic body) coupled at the other end of the structure. The reactions taking place in the process of the present invention, employing sodium naphthionate as the specific example may be illustrated conveniently as follows:

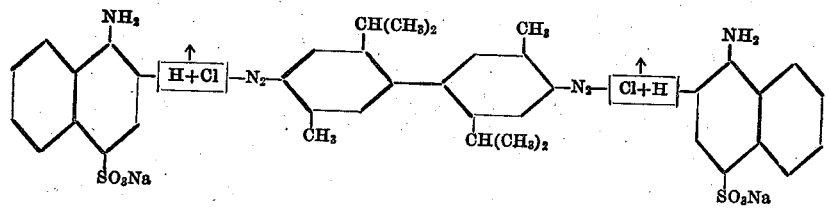

(Two molecules of hydrochloric acid are produced and liberated by this reaction).

What I claim is:

1. The herein described new dyestuffs consisting of the tetrazo compound of dimethyl-diisopropyl-benzidin coupled with an amino aromatic compound, said dyes being capable of dyeing fabric in an alkaline bath.

2. The herein described new dyestuffs having the general formula

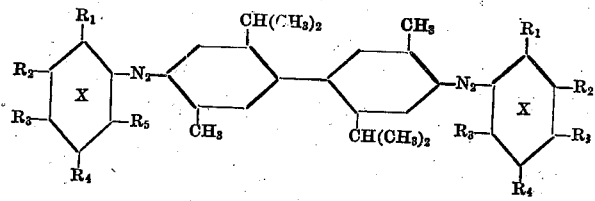

in which each of the components X consists of a plurality of benzene nuclei, and in each of which components at least one $NH_2$ group is substituted.

3. The herein described new dyestuffs having the general formula

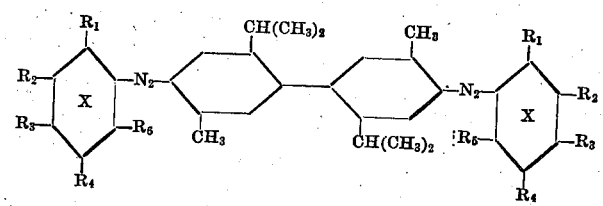

in which each of the components X consists of an aromatic residue containing an $HSO_3$ group and an $NH_2$ group.

4. A dyestuff consisting of the tetrazo compound of dimethyl-diisopropyl-benzidin coupled with sodium naphthionate, capable of dyeing cotton in an alkaline bath.

In testimony whereof I affix my signature.

CHESTER E. ANDREWS.